US011836703B2

(12) United States Patent
Han et al.

(10) Patent No.: US 11,836,703 B2
(45) Date of Patent: *Dec. 5, 2023

(54) METHOD AND APPARATUS FOR GENERATING TWO-DIMENSIONAL PAYMENT CODE

(71) Applicant: Advanced New Technologies Co., Ltd., Grand Cayman (KY)

(72) Inventors: Zhe Han, Hangzhou (CN); Mengxue Zheng, Hangzhou (CN); Jun Wu, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 236 days.

This patent is subject to a terminal disclaimer.

(21) Appl. No.: 17/461,461

(22) Filed: Aug. 30, 2021

(65) Prior Publication Data

US 2022/0051224 A1 Feb. 17, 2022

Related U.S. Application Data

(63) Continuation of application No. 17/084,284, filed on Oct. 29, 2020, now Pat. No. 11,107,062, which is a (Continued)

(30) Foreign Application Priority Data

Aug. 2, 2018 (CN) .......................... 201810872872.5

(51) Int. Cl.
*G06Q 20/32* (2012.01)
*G06Q 20/10* (2012.01)
*H04L 9/32* (2006.01)

(52) U.S. Cl.
CPC ....... *G06Q 20/3274* (2013.01); *G06Q 20/102* (2013.01); *H04L 9/3247* (2013.01)

(58) Field of Classification Search
CPC .................................................. G06Q 20/3274
See application file for complete search history.

(56) References Cited

U.S. PATENT DOCUMENTS

2012/0000978 A1 1/2012 Rollyson et al.
2012/0166491 A1 6/2012 Angus et al.
(Continued)

FOREIGN PATENT DOCUMENTS

CN 102842081 12/2012
CN 105407079 3/2016
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Ojo O Oyebisi
(74) *Attorney, Agent, or Firm* — Fish & Richardson P.C.

(57) ABSTRACT

Embodiments of the present specification provide methods and apparatuses for generating two-dimensional codes. One method comprising: receiving, by a secure element chip comprised in a two-dimensional code display device, code information comprising an account identifier of an account associated with the two-dimensional code display device; in response to obtaining a digital certificate for a private key stored in the secure element chip, signing, by the security element chip, the code information by using the private key to generate signed code information; and providing, the signed code information to the two-dimensional code display device for the two-dimensional code display device to generate and display a two-dimensional code based on the code information, wherein the two-dimensional code com- (Continued)

prises information associated with the account identifier and changes dynamically over time.

20 Claims, 7 Drawing Sheets

Related U.S. Application Data continuation of application No. PCT/CN2019/091535, filed on Jun. 17, 2019.

(56) References Cited

U.S. PATENT DOCUMENTS

2014/0310182 A1* 10/2014 Cummins .......... G06Q 20/3274 705/72
2016/0255078 A1 9/2016 Zhang

FOREIGN PATENT DOCUMENTS

| CN | 206378885 | 8/2017 |
| CN | 107194695 | 9/2017 |
| CN | 108256863 | 7/2018 |
| CN | 109345230 | 2/2019 |
| TW | 201710969 | 3/2017 |

OTHER PUBLICATIONS

Nakamoto, "Bitcoin: A Peer-to-Peer Electronic Cash System," www.bitcoin.org, 2005, 9 pages.

PCT International Preliminary Report on Patentability in International Application No. PCT/CN2019/091535, dated Feb. 2, 2021, 10 pages [with partial English translation].

PCT International Search Report and Written Opinion in International Application No. PCT/CN2019/091535, dated Sep. 18, 2019, 9 pages [with partial English translation].

Qiao, "Dynamic QR code generation and verification method," Electronic Technology and Softward Engineering, Dec. 2017, 24:163 (with machine translation).

Zheng et al., "Research on Security Authentication Based on Dynamic Two-dimensional Code," Journal of Hubei Polytechnic University, Apr. 2015, 31(2):35-38 (with English abstract).

* cited by examiner

METHOD AND APPARATUS FOR GENERATING TWO-DIMENSIONAL PAYMENT CODE

CROSS-REFERENCE TO RELATED APPLICATIONS

This application is a continuation of and claims the benefit of priority of U.S. patent application Ser. No. 17/084,284, filed on Oct. 29, 2020, which is a continuation of PCT Application No. PCT/CN2019/091535, filed on Jun. 17, 2019, which claims priority to Chinese Patent Application No. 201810872872.5, filed on Aug. 2, 2018, and each application is hereby incorporated by reference in its entirety.

TECHNICAL FIELD

The present disclosure relates to the field of payment technologies, and in particular, to methods and apparatuses for generating a two-dimensional payment code.

BACKGROUND

Currently, most two-dimensional code-based payment devices are designed to be scanned. To be specific, the user presents a payment code/barcode on the mobile phone, and the shopkeeper actively scans the payment code of the user and deducts money. In this case, a merchant's device needs to have a camera module, and precision of the camera needs to satisfy a certain requirement. The merchant always needs to input the amount manually. Therefore it is not suitable for merchants conducting small-amount transactions frequently. In addition, in a barcode payment service, a security requirement is relatively high. If security is relatively low, a payment limit can be controlled.

SUMMARY

In view of this, one or more embodiments of the present specification provide methods and apparatuses for generating a two-dimensional payment code, to improve security of barcode payment.

Specifically, the one or more embodiments of the present specification are implemented by using the following technical solutions:

According to a first aspect, a method for generating a two-dimensional payment code is provided. The method is performed by a secure element chip in a two-dimensional code display device, and the method includes the following: receiving to-be-signed code information, where the code information includes an account identifier of a payment account associated with the two-dimensional code display device; when it is determined that a private key stored in the secure element chip is in an available state, signing the code information by using the private key, where the available state indicates that the private key has obtained a digital certificate; and returning the signed code information to the two-dimensional code display device, so that the two-dimensional code display device displays a two-dimensional payment code based on the code information, where the two-dimensional code includes the account identifier, and the two-dimensional code dynamically changes.

According to a second aspect, a transaction payment method is provided. The method is performed by a payment server, and the method includes the following: receiving a transaction payment request, where the transaction payment request is sent after a dynamic two-dimensional code on a two-dimensional code display device is scanned, the transaction payment request includes an account identifier of a payment account obtained by parsing the dynamic two-dimensional code, and the account identifier is signed by a secure element chip in the two-dimensional code display device by using a private key; and after the account identifier of the payment account is verified by using a public key, performing transaction payment processing based on the account identifier of the payment account.

According to a third aspect, an apparatus for generating a two-dimensional payment code is provided. The apparatus is applied to a secure element chip in a two-dimensional code display device, and the apparatus includes the following: an information receiving module, configured to receive to-be-signed code information, where the code information includes an account identifier of a payment account associated with the two-dimensional code display device; a signature processing module, configured to: when it is determined that a private key stored in the secure element chip is in an available state, sign the code information by using the private key, where the available state indicates that the private key has obtained a digital certificate; and a plaintext code transmission module, configured to return the signed code information to the two-dimensional code display device, so that the two-dimensional code display device displays a two-dimensional payment code based on the code information, where the two-dimensional code includes the account identifier, and the two-dimensional code dynamically changes.

According to a fourth aspect, a transaction payment apparatus is provided. The apparatus is applied to a payment server, and the apparatus includes the following: a request receiving module, configured to receive a transaction payment request, where the transaction payment request is sent after a dynamic two-dimensional code on a two-dimensional code display device is scanned, the transaction payment request includes an account identifier of a payment account obtained by parsing the dynamic two-dimensional code, and the account identifier is signed by a secure element chip in the two-dimensional code display device by using a private key; and a transaction processing module, configured to: after the account identifier of the payment account is verified by using a public key, perform transaction payment processing based on the account identifier of the payment account.

According to a fifth aspect, a device for displaying a two-dimensional payment code is provided. The device includes a secure element chip, the secure element chip stores security data, and the security data is obtained by a payment server based on a payment account associated with a two-dimensional code display device and sent to the secure element chip; and the secure element chip includes a memory, a processor, and a computer instruction that is stored in the memory and can run on the processor, and the processor executes the instruction to perform the following steps: receiving to-be-signed code information, where the code information includes an account identifier of the payment account associated with the two-dimensional code display device, and the code information is generated based on the security data; when it is determined that a private key stored in the secure element chip is in an available state, signing the code information by using the private key, where the available state indicates that the private key has obtained a digital certificate; and returning the signed code information to the two-dimensional code display device, so that the two-dimensional code display device displays a two-dimensional payment code corresponding to the code information on a screen, where the two-dimensional code includes the account identifier, and the two-dimensional code dynamically changes.

According to a sixth aspect, a payment server is provided. The server includes a memory, a processor, and a computer instruction that is stored in the memory and can run on the processor, and the processor executes the instruction to perform the following steps: receiving a transaction payment request, where the transaction payment request is sent after a dynamic two-dimensional code on a two-dimensional code display device is scanned, the transaction payment request includes an account identifier of a payment account obtained by parsing the dynamic two-dimensional code, and the account identifier is signed by a secure element chip in the two-dimensional code display device by using a private key; and after the account identifier of the payment account is verified by using a public key, performing transaction payment processing based on the account identifier of the payment account.

According to the method and the apparatus in the one or more embodiments of the present specification, an SE chip in a device performs digital signature on a two-dimensional code, and a private key used for digital signature is digitally authenticated. This method ensures security of two-dimensional code-based transaction.

BRIEF DESCRIPTION OF DRAWINGS

To describe the technical solutions in one or more embodiments of the present specification or in the existing technology more clearly, the following briefly describes the accompanying drawings for describing some embodiments or the existing technology. Clearly, the accompanying drawings in the following description merely show some embodiments described in the one or more embodiments of the present specification, and a person of ordinary skill in the art can still derive other drawings from these accompanying drawings without creative efforts.

DESCRIPTION OF EMBODIMENTS

To make a person skilled in the art understand the technical solutions in one or more embodiments of the present specification better, the following clearly and comprehensively describes the technical solutions in the one or more embodiments of the present specification with reference to the accompanying drawings in the one or more embodiments of the present specification. Clearly, the described embodiments are merely some but not all of some embodiments. All other embodiments obtained by a person of ordinary skill in the art based on the one or more embodiments of the present specification without creative efforts shall fall within the protection scope of the present application.

In recent years, the code scanning payment method has been popularized in people's lives. Many stores, supermarkets, retail stores, street stalls, and vendors selling daily necessities have their own payment collection codes. Customers have become accustomed to this convenient payment method. A merchant usually uses a static barcode such as a pasted static payment collection code for collection. Scanning a "barcode" or "two-dimensional code" to complete collection/payment is called barcode payment.

However, barcode payment has certain technical risks, and as the market is growing, security problems are becoming more serious. To improve security of barcode payment, at least one embodiment of the present specification provides a transaction payment method. In this method, verification is performed by using a method in which a digital certificate and an electronic signature are used, and a secure element chip (which is a secure element and usually provided in the form of a chip) is further used during generation of a payment collection code, so as to ensure security of barcode payment.

In an application scenario of at least one example of the present specification, a merchant can present a payment collection code, and the payment collection code is generated by using the method for generating a two-dimensional payment code in at least one embodiment of the present specification. A payer can scan the payment collection code for payment. In addition, the payment collection code presented by the merchant is a code that can dynamically change. It can be understood that the method can also be applied to generation of a payment code. In the following description, generation of a payment collection code is used as an example for description.

Figure 1:
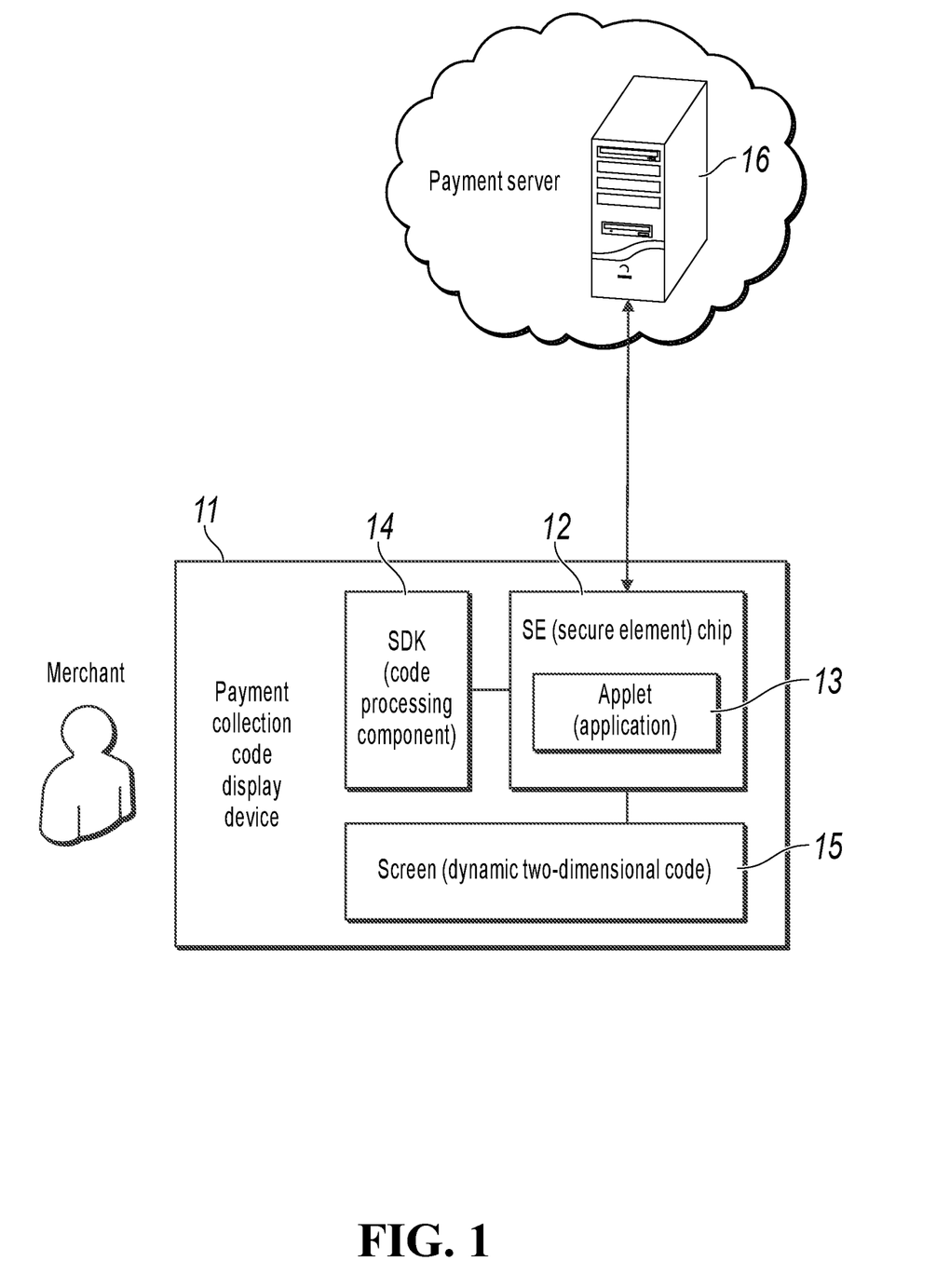
FIG. 1 is an architectural diagram illustrating an application system of a transaction payment method, according to one or more embodiments of the present specification.

FIG. 1 is an architectural diagram illustrating an application system of a transaction payment method. As shown in FIG. 1, a merchant can purchase a two-dimensional code display device 11. The device can include a secure element chip 12, the secure element chip 12 can download and install an applet 13, and the applet 13 can be an application running on a JAVA CARD operating system, and usually runs on the SE chip. In the transaction payment method provided in the present specification, the applet 13 can be used to perform processing such as signing a payment collection code in the SE chip.

Further referring to FIG. 1, in addition to the JAVA CARD operating system in the SE chip, the two-dimensional code display device 11 can have a device operating system. The system can be an embedded system (or another system such as an ANDROID system). In the embedded system, a code processing component software development kit (SDK) 14 can be included. The code processing component 14 can cooperate with the applet 13 to complete generation of a dynamic payment collection code. A dynamic payment collection code finally generated can be displayed on a screen 15, so that a payer scans the payment collection code for payment. In addition, it is worthwhile to note that disposing the SDK in FIG. 1 in the embedded operating system of the two-dimensional code display device is used as an example, and a position for disposing the SDK is not limited. For example, the SDK can be disposed in the SE chip, which can be more secure. In the following example description, an example of disposing the SDK in the embedded system is used.

In addition, the secure element chip 12 can be connected to a payment server 16 on the cloud, and the payment server 16 can send some information needed for the generation of a payment collection code to the secure element chip 12. In addition, the secure element chip 12 and the payment server 16 can also cooperate to ensure security of transaction payment. For example, the secure element chip 12 can sign a payment collection code by using a private key, and the payment server can obtain information in the payment collection code through decryption using a corresponding public key, to ensure security of transaction payment.

In the following description, an example of using a two-dimensional code as a payment collection code is used to describe how a merchant uses the method provided in at least one embodiment of the present specification to perform collection. How a two-dimensional code display device is used and how the device and a payment server interact and cooperate with each other are further described.

First, the device is associated with the payment server.

In a trusted environment, the two-dimensional code display device 11 is associated with the payment server on the cloud.

For example, the payment server 16 can generate a unique ID used for device management inside the server based on a MAC address (or another attribute specific to the device) of the device. The unique ID can be referred to as a device identifier.

The payment server 16 can send the device identifier to the two-dimensional code display device for storage. Specifically, the device identifier can be stored in the secure element chip 12.

In addition, if the device identifier cannot be directly read for security reasons, the SE chip can further store an encryption key. Each time the device identifier needs to be read from the SE chip, the SE chip can encrypt the device identifier by using the encryption key (or can encrypt the device identifier after mixing other information such as a random number or a timestamp of the device identifier, to make decryption more difficult), so as to prevent any system other than the payment server on the cloud from obtaining the information.

In addition to the device identifier, the payment server 16 can send some other configuration information only related to the device to the secure element chip 12, for example, a key for connecting to a network. The key can be used to encrypt subsequent transmission data after the two-dimensional code display device is connected to the payment server, so that data security can be ensured.

Then the device is associated with a payment account of a merchant, and an initialization operation is performed on the device.

For example, the device identifier can be stored in the two-dimensional code display device before the device is shipped from the factory. Therefore, after the merchant purchases the two-dimensional code display device, the device has stored the device identifier. When the device is used for the first time, the merchant can start the two-dimensional code display device. The device can display a two-dimensional code, and the two-dimensional code includes the device identifier stored in the SE chip. In addition, the device identifier in the two-dimensional code can also be encrypted by using an encryption key, and the payment server can also prestore a decryption key, so that the payment server can decrypt the encrypted device identifier to obtain the identifier.

The merchant can scan the two-dimensional code by using a mobile phone of the merchant. A payment application corresponding to the payment server is installed on the mobile phone, and the merchant can scan the two-dimensional code through a "Scan" function in the payment application. After the code is scanned, the payment application can send a message to the payment server 16. The message includes the encrypted device identifier of the two-dimensional code display device and a payment account used by the payment application of the merchant (the payment application logs in by using the account).

The payment server 16 can associate the payment account of the merchant with the two-dimensional code display device purchased by the merchant based on the message. For example, the following mapping relationship can be recorded on the server side:

TABLE 1

Association of a payment account with a device

| Two-dimensional code display device | Payment account |
|---|---|
| ID-1 | Account-1 |

Figure 2:
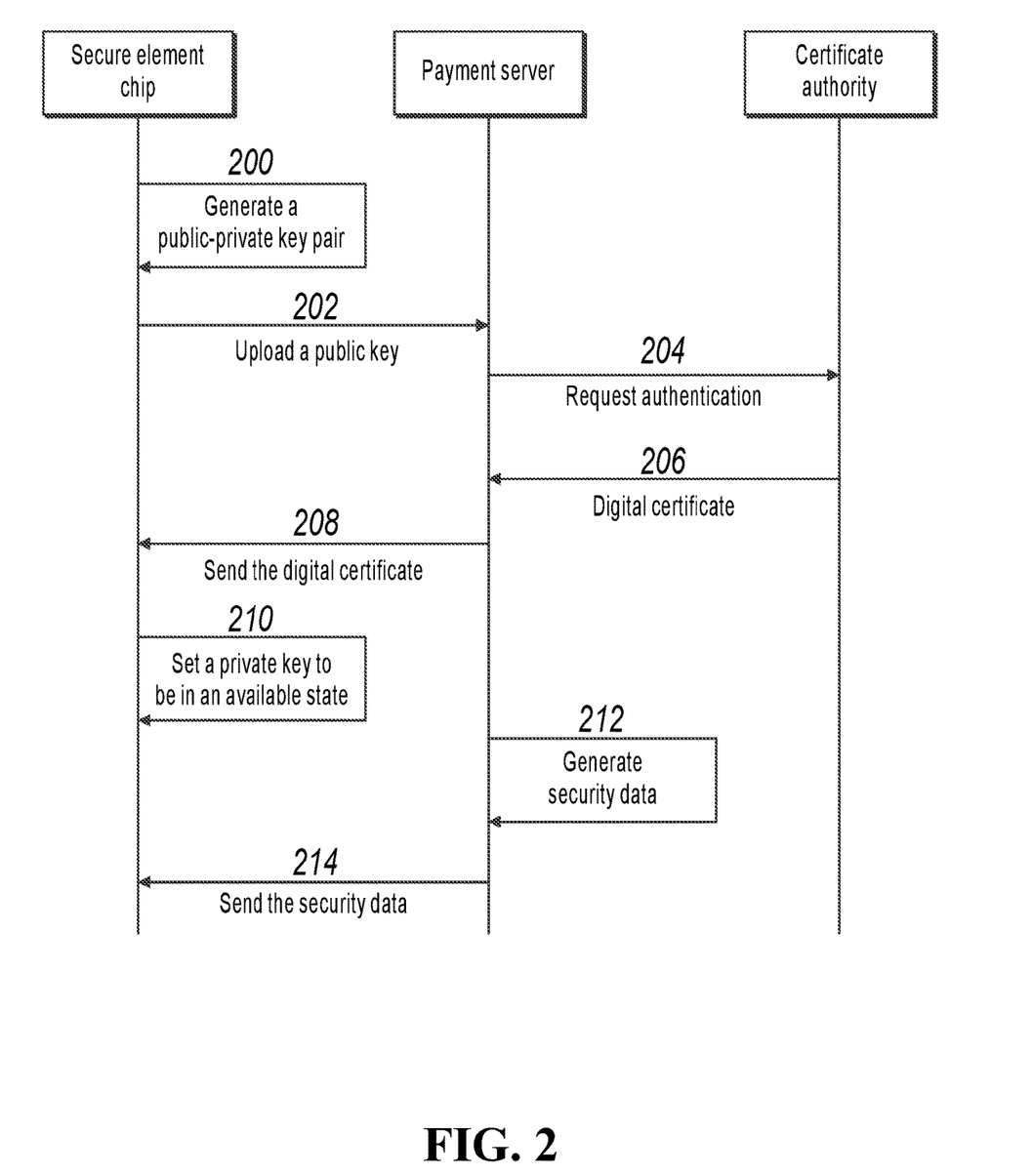
FIG. 2 is a schematic diagram illustrating an execution process of a chip, according to one or more embodiments of the present specification.

After the payment account of the merchant and the two-dimensional code display device of the merchant are bound, the payment server can notify the SE chip that association is completed, and trigger the chip to start to perform a process shown in FIG. 2. The SE chip starts to generate a public-private key pair. It is worthwhile to note that an execution sequence of steps is not limited in this example.

Step 200: The secure element chip generates a public-private key pair.

Step 202: The secure element chip uploads a public key to the payment server on the cloud.

Step 204: The payment server sends the public key to a certificate authority for authentication.

Step 206: The payment server receives a digital certificate returned after the authentication succeeds. The digital certificate indicates that the public key in the public-private key pair has been authenticated.

Step 208: The payment server sends the digital certificate to the secure element chip.

Step 210: The secure element chip stores the digital certificate, and sets a private key to be in an available state.

In this step, after the digital certificate is received, the public key in the public-private key pair is authenticated, and therefore the public-private key pair can be used for generating and verifying digital signatures. Otherwise, if the authentication fails, the SE chip does not use the public-private key pair that has just been generated. The SE chip can store the digital certificate, and set the corresponding private key to be in the available state.

Step 212: The payment server generates security data based on the payment account.

In this step, the payment server can perform processing in two aspects.

In one aspect, the payment server can store the public key in the mapping relationship of Table 1, and the stored public key can be used for decryption when a payment request is subsequently initiated for scanning a payment collection code on the two-dimensional code display device. For an updated mapping relationship, references can be made to Table 2.

TABLE 2

Association of a payment account with a device

| Device identifier of a two-dimensional code display device | Payment account | Public key |
|---|---|---|
| ID-1 | Account-1 | Public key-1 |

In the other aspect, the payment server can generate the security data. The security data is related to a user. For example, different merchants have different payment accounts, and corresponding security data can be different. The security data here can include a related configuration parameter used to generate a two-dimensional code, or can include another parameter not related to generation of a two-dimensional code.

Step 214: The payment server sends the security data to the secure element chip for storage.

So far, the two-dimensional code display device is initialized. It can be seen from the previous description that, after the merchant obtains the two-dimensional code display device, the merchant only needs to scan a two-dimensional code on the device through the "Scan" function in the payment application on the mobile phone, to trigger the payment server on the cloud to associate the payment account of the merchant with the device, and trigger processing such as generation of the public and private keys of the device, and sending of configuration parameters. After the device is initialized, the secure element chip in the two-dimensional code display device has stored the digital certificate and the available private key, and further stored some configuration parameters to be used for generation of a two-dimensional code. Then the device can be used for collection.

In addition, after the merchant performs dissociation, the SE chip can also be triggered to delete the public-private key pair. For example, the merchant can perform dissociation by using the payment application on the mobile phone of the merchant. After receiving a dissociation request, the payment server can instruct the SE chip to delete the public-private key pair.

Then, the merchant uses the device for collection.

After the device is initialized, the merchant can use the device for collection. In daily use, the device can generate and display a dynamic two-dimensional code, and a payer can scan the dynamic two-dimensional code for payment.

Figure 3:
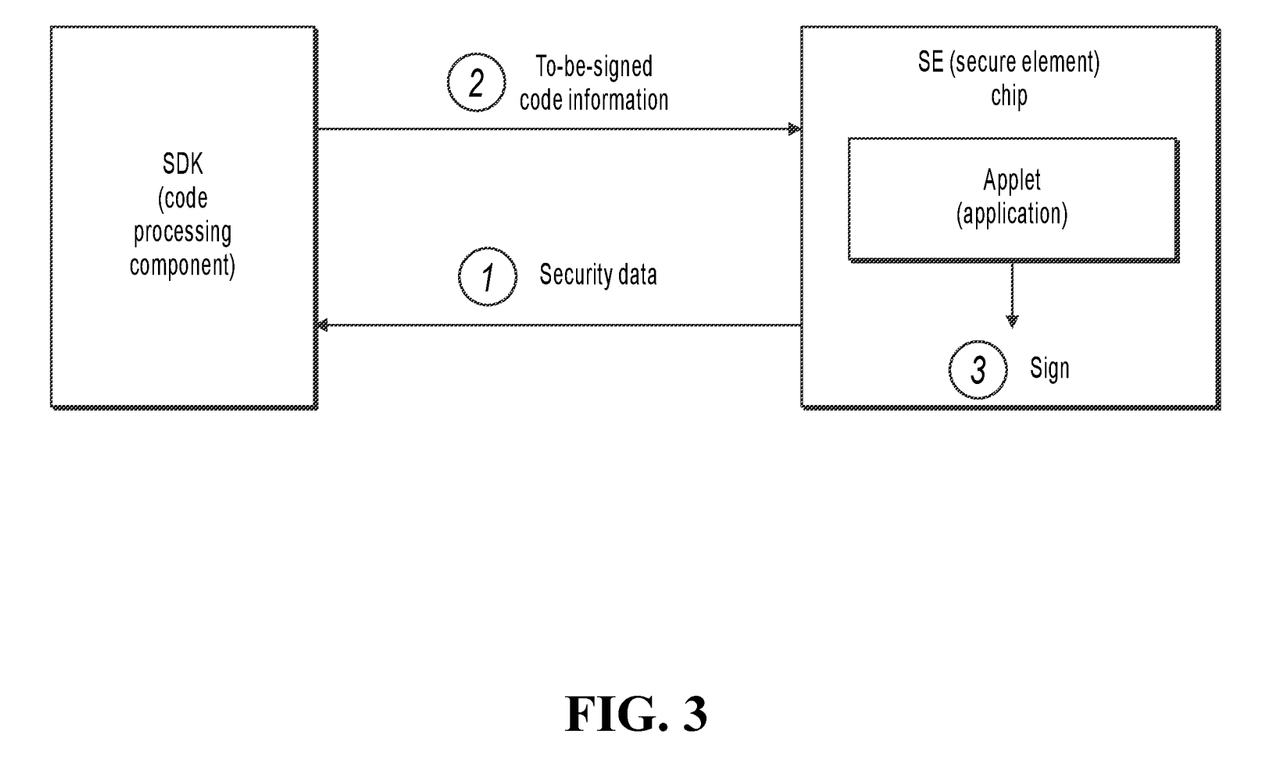
FIG. 3 is a schematic diagram illustrating generation of a two-dimensional code, according to one or more embodiments of the present specification.

An embedded system of the two-dimensional code display device can send an instruction to the SE chip, indicating that subsequent operations are performed by an applet in the chip. FIG. 3 shows a process in which an SDK cooperates with an applet to generate a two-dimensional code. As shown in FIG. 3, the process can include the following processing:

First, the applet can transmit security data stored in a chip to the code processing component (SDK).

Then the SDK processes the security data, and generates to-be-signed code information based on the security data. The code information can include an account identifier of a payment account associated with a two-dimensional code display device. When scanning the code, a payer can obtain the account identifier through parsing. A payment server can obtain the payment account based on the account identifier.

Finally, in the SE chip, the applet can perform complexity processing on the code information, for example, mixing the code information with at least one of a timestamp and a random number. In addition, the applet performs code display processing on code information obtained after complexity processing, and signs the code information by using a private key. The signed code information can be converted into a two-dimensional code for display. Before using the private key, the applet can first determine whether the private key is available. If the private key is not available (e.g., is not marked as available), the applet can reject signing, to prevent a possible transaction risk.

After the signing, the chip can send the signed code information to an embedded system of the two-dimensional code display device, so that the device operating system displays the two-dimensional code on a screen based on the code information. The two-dimensional code also includes the account identifier. The generated two-dimensional code is placed in the SE chip for black box processing, thereby improving security of the two-dimensional code, and making it difficult to tamper with the two-dimensional code information.

In addition, the generated two-dimensional code is dynamic, and the dynamic two-dimensional code is generated by using the following two examples of two-dimensional refresh mechanisms.

For example, the two-dimensional code can be periodically refreshed. FIG. 3 shows an example of a process of generating a two-dimensional code. In this case, the secure element chip can send a code seed to the code processing component (SDK) in the two-dimensional code display device at intervals of predetermined time periods, and then processing in FIG. 3 is sequentially performed to generate a two-dimensional code for display. For example, the process in FIG. 3 is performed at intervals oft.

For another example, the two-dimensional code can be refreshed due to an event trigger. Each time a payer scans a payment collection code on the device, a transaction payment request is sent to the payment server to request payment. After receiving a code refresh notification sent by the payment server, the secure element chip in the device can send security data to the code processing component (SDK) in the two-dimensional code display device, and start to generate a new two-dimensional code. The code refresh notification is sent by the payment server when the payment server receives a code scanning event trigger. For example, when a payer performs code scanning for payment, the payment server is notified of the code scanning and receives the code scanning event trigger, and then the payment server can send the code refresh notification to the SE chip. After a payer pays, a payment collection code on the device is refreshed once. After another payer pays, a payment collection code on the device is refreshed again. As such, dynamic refreshing is implemented.

In each process of generating a two-dimensional code in FIG. 3, generated two-dimensional codes can be different. This difference can be as follows: Code information generated by the code processing component based on security data dynamically changes, so that a payment collection code changes accordingly; or when the secure element chip signs the code information, a dynamically changing random number or timestamp is mixed with the code information, so that the two-dimensional code changes accordingly.

Figure 4:
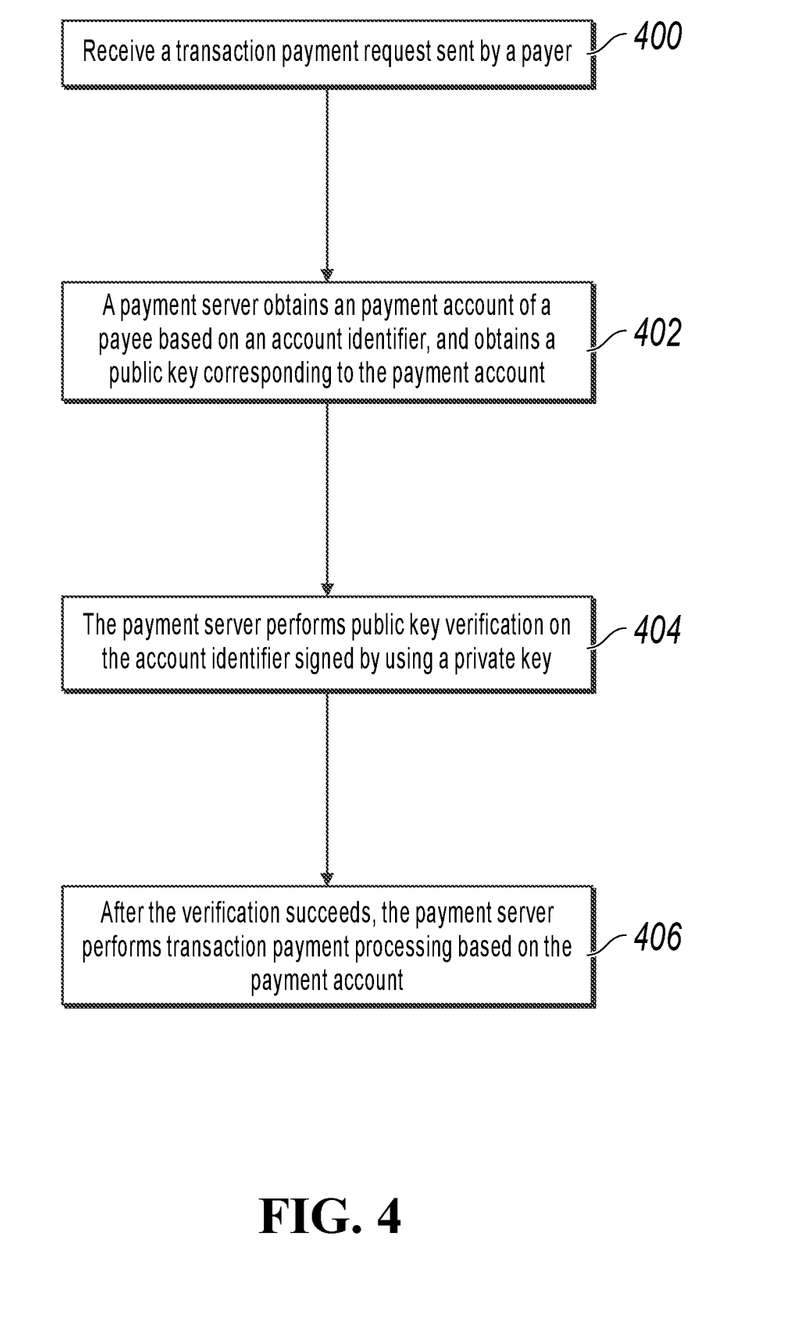
FIG. 4 shows transaction processing of a payment server, according to one or more embodiments of the present specification.

How the two-dimensional code display device generates a dynamic two-dimensional code for collection is described above. In the process of generating the payment collection code, a digital certificate and an electronic signature are used, and the payment collection code is dynamic. Next, FIG. 4 shows payment processing on a payment server side according to at least one embodiment of the present specification. The payment processing can be performed after the payment server receives a payment request initiated by a payer after the payer scans a dynamic payment collection code. As shown in FIG. 4, the payment processing can include the following steps.

Step 400: The payment server receives a transaction payment request sent by a payer, where the transaction payment request is sent after the payer scans a dynamic payment code on a two-dimensional code display device.

For example, the transaction payment request can include code information signed by a secure element chip in the two-dimensional code display device by using a private key, and the code information can include an account identifier that uniquely identifies a payment account.

Step 402: The payment server obtains the payment account of a payee based on the account identifier, and obtains a public key corresponding to the payment account.

For example, the payment server can search a prestored mapping relationship between a payment account and a public key to obtain the public key used for verification.

Step 404: The payment server performs public key verification on the account identifier signed by using the private key.

In step 406, after the verification succeeds, the payment server performs transaction payment processing based on the payment account. For example, a transfer is made from a payment account of the payer to the payment account of the merchant.

It can be seen from the previous description in the transaction payment method that, in the SE chip, main processing is performed by an applet. In the process of generating a payment collection code, processing performed by the applet can be a process shown in FIG. 5. The process includes the following steps.

Figure 5:
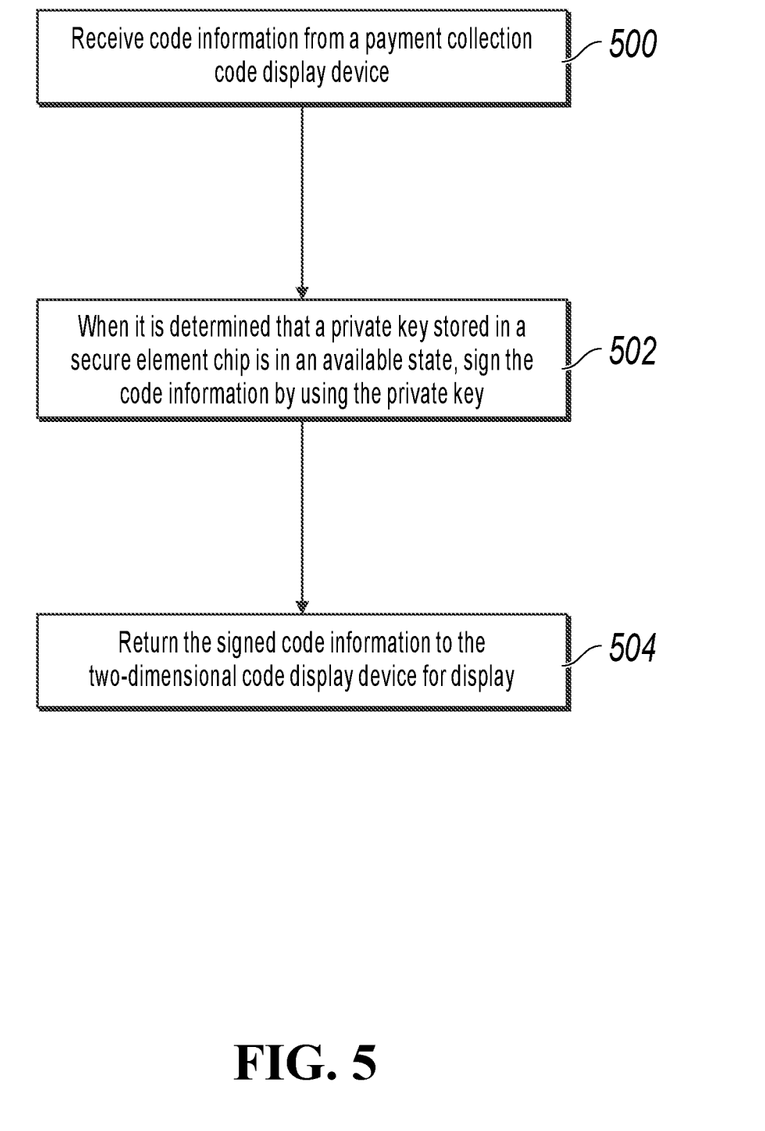
FIG. 5 is a flowchart illustrating signing processing of a chip, according to one or more embodiments of the present specification.

Step 500: Receive code information transmitted by a two-dimensional code display device. For example, the code information can be code information transmitted by an SDK in an embedded system of the device to an SE chip, or can be code information sent by an SDK in an SE chip.

Step 502: When it is determined that a private key stored in the secure element chip is in an available state, sign the code information by using the private key, where the available state indicates that the private key has obtained a digital certificate.

Step 504: Return the signed code information to the two-dimensional code display device, so that the two-dimensional code display device displays a two-dimensional payment code based on the code information, where the two-dimensional code dynamically changes.

In addition, at least one embodiment of the present specification further provides a two-dimensional code display device. The device generates a dynamic two-dimensional code by using a digital certificate and a digital signature, to ensure security of a two-dimensional code-based transaction. In addition, the two-dimensional code display device can enable a merchant to perform collection by using a dynamic payment collection code, so that the collection is convenient and secure.

Figure 6:
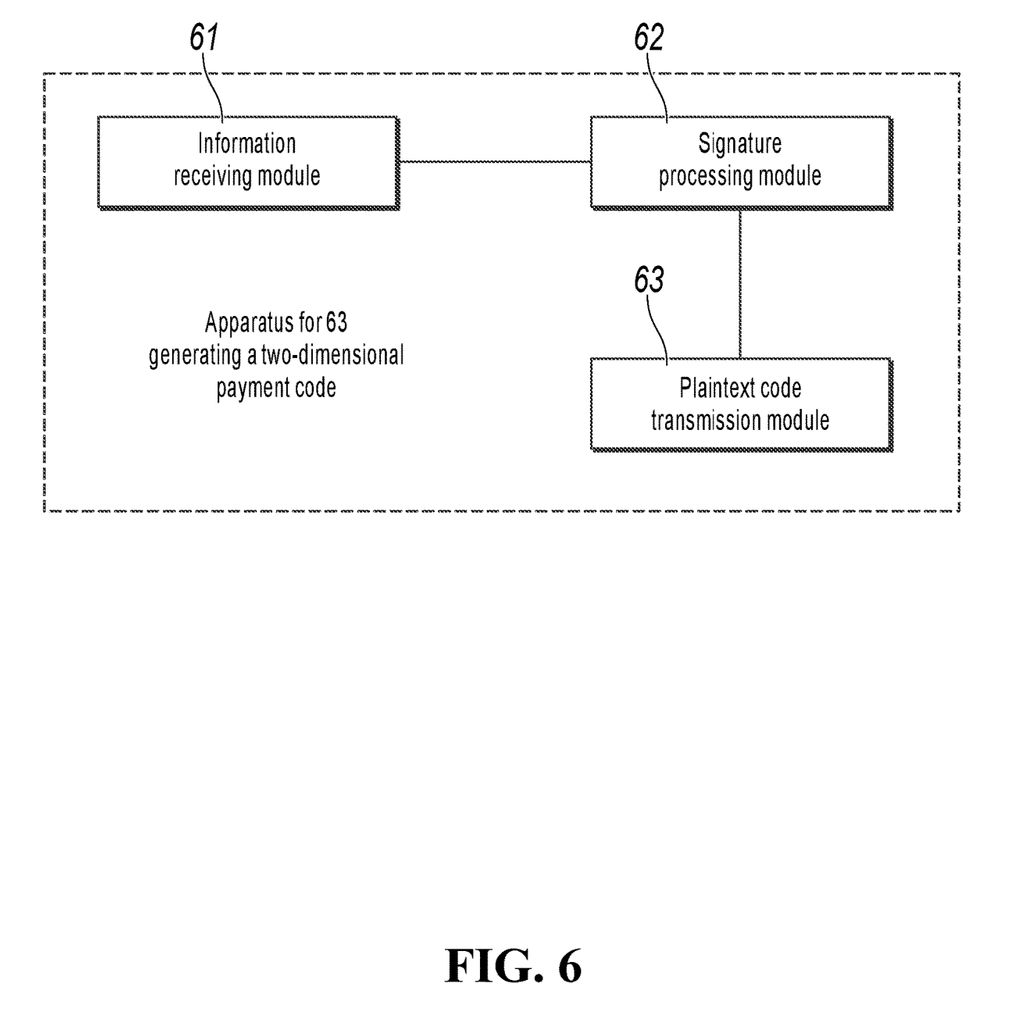
FIG. 6 is a schematic structural diagram illustrating an apparatus for generating a two-dimensional code, according to one or more embodiments of the present specification.

To implement the previously described method for generating a two-dimensional payment code, at least one embodiment of the present specification provides an apparatus for generating a two-dimensional payment code. The apparatus is applied to a secure element chip in a two-dimensional code display device. As shown in FIG. 6, the apparatus can include an information receiving module 61, a signature processing module 62, and a plaintext code transmission module 63.

The information receiving module 61 is configured to receive to-be-signed code information, where the code information includes an account identifier of a payment account associated with the two-dimensional code display device.

The signature processing module 62 is configured to: when it is determined that a private key stored in the secure element chip is in an available state, sign the code information by using the private key, where the available state indicates that the private key has obtained a digital certificate.

The plaintext code transmission module 63 is configured to return the signed code information to the two-dimensional code display device, so that the two-dimensional code display device displays a two-dimensional payment code based on the code information, where the two-dimensional code includes the account identifier, and the two-dimensional code dynamically changes.

In an example, the information receiving module 61 is further configured to receive security data sent by a payment server, where the security data is obtained by the payment server based on the payment account associated with the two-dimensional code display device; and store the security data.

The plaintext code transmission module 63 is further configured to transmit the security data to a code processing component (SDK) in the two-dimensional code display device, so that the code processing component generates the to-be-signed code information based on the security data.

In an example, the signature processing module 62 is further configured to generate a public-private key pair; upload a public key to the payment server, so that the payment server sends the public key to a certificate authority for authentication; receive and store a digital certificate sent by the payment server, where the digital certificate indicates that the public key in the public-private key pair has been authenticated; and set a private key in the public-private key pair to be in the available state.

Figure 7:
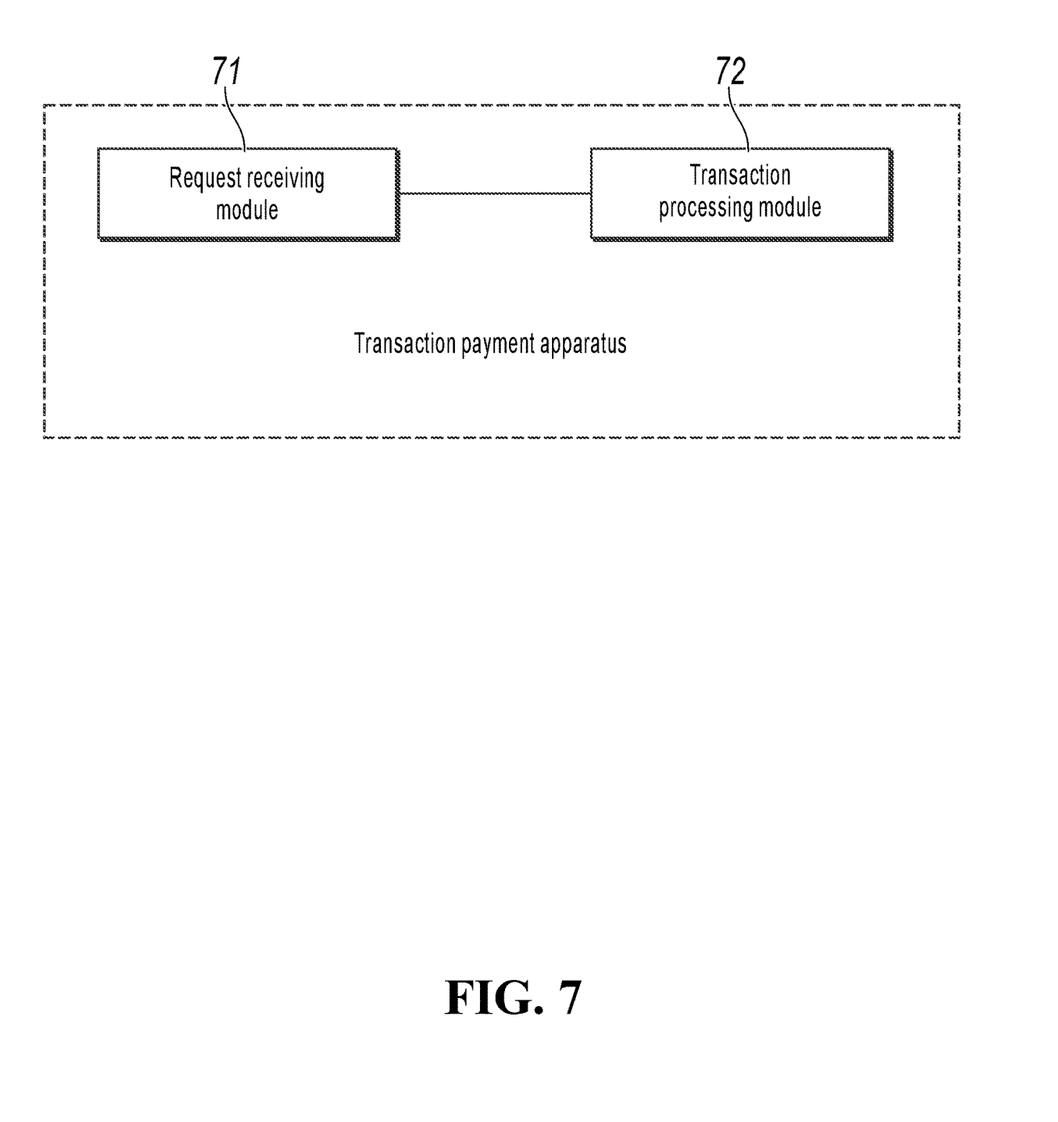
FIG. 7 is a schematic structural diagram illustrating a transaction payment apparatus, according to one or more embodiments of the present specification.

To implement the previously described transaction payment method, at least one embodiment of the present specification provides a transaction payment apparatus. The apparatus is applied to a payment server. As shown in FIG. 7, the apparatus can include a request receiving module 71 and a transaction processing module 72.

The request receiving module 71 is configured to receive a transaction payment request, where the transaction payment request is sent after a dynamic two-dimensional code on a two-dimensional code display device is scanned, the transaction payment request includes an account identifier of a payment account obtained by parsing the dynamic two-dimensional code, and the account identifier is signed by a secure element chip in the two-dimensional code display device by using a private key.

The transaction processing module 72 is configured to: after the account identifier of the payment account is verified by using a public key, perform transaction payment processing based on the account identifier of the payment account.

An execution sequence of the steps in the process shown in the method embodiment is not limited to the sequence in the flowchart. In addition, descriptions of steps can be implemented as a form of software, hardware, or a combination thereof. For example, a person skilled in the art can implement the descriptions in a form of software code, and the code can be a computer executable instruction that can implement logical functions corresponding to the steps.

When being implemented in a software form, the executable instruction can be stored in a memory and executed by a processor in a device.

For example, corresponding to the previously described method, one or more embodiments of the present specification provide a device for displaying a two-dimensional payment code. The device includes a secure element chip, the secure element chip stores security data, and the security data is obtained by a payment server based on a payment account associated with a two-dimensional code display device and sent to the secure element chip. The secure element chip includes a memory, a processor, and a computer instruction that is stored in the memory and can run on the processor, and the processor executes the instruction to perform the following steps: receiving to-be-signed code information, where the code information includes an account identifier of the payment account associated with the two-dimensional code display device, and the code information is generated based on the security data; when it is determined that a private key stored in the secure element chip is in an available state, sign the code information by using the private key, where the available state indicates that the private key has obtained a digital certificate; and returning the signed code information to the two-dimensional code display device, so that the two-dimensional code display device displays a two-dimensional payment code corresponding to the code information on a screen, where the two-dimensional code includes the account identifier, and the two-dimensional code dynamically changes.

For example, corresponding to the previously described method, one or more embodiments of the present specification provide a payment server. The server includes a memory, a processor, and a computer instruction that is stored in the memory and can run on the processor, and the processor executes the instruction to perform the following steps: receiving a transaction payment request, where the transaction payment request is sent after a dynamic two-dimensional code on a two-dimensional code display device is scanned, the transaction payment request includes an account identifier of a payment account obtained by parsing the dynamic two-dimensional code, and the account identifier is signed by a secure element chip in the two-dimensional code display device by using a private key; and after the account identifier of the payment account is verified by using a public key, performing transaction payment processing based on the account identifier of the payment account.

The apparatuses or modules described in the previous embodiments can be implemented by a computer chip or an entity, or can be implemented by a product with a certain function. A typical embodiment device is a computer, and the computer can be specifically a personal computer, a laptop computer, a cellular phone, a camera phone, a smartphone, a personal digital assistant, a media player, a navigation device, an email receiving and sending device, a game console, a tablet, a wearable device, or any combination of these devices.

For ease of description, the previous apparatus is described by dividing the functions into various modules. Certainly, in the one or more embodiments of the present specification, a function of each module can be implemented in one or more pieces of software and/or hardware.

A person skilled in the art should understand that one or more embodiments of the present specification can be provided as a method, a system, or a computer program product. Therefore, the one or more embodiments of the present specification can use a form of hardware only embodiments, software only embodiments, or embodiments with a combination of software and hardware. In addition, the one or more embodiments of the present specification can use a form of a computer program product that is implemented on one or more computer-usable storage media (including but not limited to a disk memory, a CD-ROM, an optical memory, etc.) that include computer-usable program code.

These computer program instructions can be stored in a computer readable memory that can instruct a computer or another programmable data processing device to work in a specific way, so that the instructions stored in the computer readable memory generate an artifact that includes an instruction device. The instruction device implements a specific function in one or more processes in the flowcharts and/or in one or more blocks in the block diagrams.

These computer program instructions can be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

It is worthwhile to further note that, the terms "include", "comprise", or their any other variants are intended to cover a non-exclusive inclusion, so a process, a method, a product, or a device that includes a list of elements not only includes those elements but also includes other elements which are not expressly listed, or further includes elements inherent to such a process, method, product, or device. Without more constraints, an element preceded by "includes a . . . " does not preclude the existence of additional identical elements in the process, method, product, or device that includes the element.

The one or more embodiments of the present specification can be described in common contexts of computer executable instructions executed by a computer, such as a program module. Generally, the program module includes a routine, a program, an object, a component, a data structure, etc. executing a specific task or implementing a specific abstract data type. The one or more embodiments of the present specification can also be practiced in distributed computing environments. In the distributed computing environments, tasks are performed by remote processing devices that are connected through a communications network. In the distributed computing environment, the program module can be located in both local and remote computer storage media including storage devices.

Some embodiments of the present specification are described in a progressive way. For same or similar parts of some embodiments, references can be made to some embodiments. Each embodiment focuses on a difference from other embodiments. Particularly, a data collection device or data processing device embodiment is basically similar to a method embodiment, and therefore, is described briefly. For related parts, references can be made to partial descriptions in the method embodiment.

Specific embodiments of the present specification are described above. Other embodiments fall within the scope of the appended claims. In some situations, the actions or steps described in the claims can be performed in an order different from the order in some embodiments and the desired results can still be achieved. In addition, the process depicted in the accompanying drawings does not necessarily require a particular execution order to achieve the desired results. In some embodiments, multi-tasking and parallel processing can be advantageous.

The previous descriptions are merely preferred embodiments of one or more embodiments of the present specification, but are not intended to limit the present disclosure. Any modification, equivalent replacement, or improvement made without departing from the spirit and principle of the present disclosure shall fall within the protection scope of the present disclosure.

What is claimed is:

1. A computer-implemented method for generating two-dimensional codes, comprising:
   receiving, by a secure element chip of a computing device, security data sent by a server, wherein the security data is obtained by the server based on an account associated with the computing device;
   storing, by the secure element chip, the security data;
   receiving, by the secure element chip, a code refresh notification sent by the server in response to the server identifying a code scanning event trigger;
   in response to receiving the code refresh notification, transmitting, by the secure element chip, the security data to at least one processor of the computing device for generating code information based on the security data;
   receiving, by the secure element chip, the code information comprising an account identifier of the account associated with the computing device;
   signing, by the security element chip, the code information by using a private key stored in the secure element chip to generate signed code information; and
   providing, the signed code information to the computing device for the computing device to generate a two-dimensional code based on the code information.

2. The computer-implemented method according to claim 1, wherein the private key stored in the secure element chip is associated with a digital certificate received by the security element chip.

3. The computer-implemented method according to claim 1, wherein the security data is transmitted to the at least one processor at predetermined intervals.

4. The computer-implemented method according to claim 2, further comprising:
   before receiving the security data, generating, by the secure element chip, a public-private key pair;
   uploading, by the secure element chip, a public key to the server for the server to send the public key to a certificate authority for authentication of the public key; and
   receiving, by the secure element chip from the server, the digital certificate indicating that the public key is authenticated.

5. The computer-implemented method according to claim 1, further comprises displaying, by the computing device, the two-dimensional code, and wherein the two-dimensional code comprises information associated with the account identifier, and changes dynamically over time.

6. The computer-implemented method according to claim 5, wherein the two-dimensional code changes dynamically according to changes of the code information generated by the at least one processor.

7. The computer-implemented method according to claim 1, wherein the two-dimensional code changes dynamically according to changes of the code information incurred by at least one of mixing one or more random numbers with the code information or mixing one or more timestamps with the code information.

8. A non-transitory, computer-readable medium storing one or more instructions executable by a computer system to perform operations comprising:
   receiving, by a secure element chip of a computing device, security data sent by a server, wherein the security data is obtained by the server based on an account associated with the computing device;
   storing, by the secure element chip, the security data;
   receiving, by the secure element chip, a code refresh notification sent by the server in response to the server identifying a code scanning event trigger;
   in response to receiving the code refresh notification, transmitting, by the secure element chip, the security data to at least one processor of the computing device for generating code information based on the security data;
   receiving, by the secure element chip, the code information comprising an account identifier of the account associated with the computing device;
   signing, by the security element chip, the code information by using a private key stored in the secure element chip to generate signed code information; and
   providing, the signed code information to the computing device for the computing device to generate a two-dimensional code based on the code information.

9. The non-transitory, computer-readable medium according to claim 8, wherein the private key stored in the secure element chip is associated with a digital certificate received by the security element chip.

10. The non-transitory, computer-readable medium according to claim 8, wherein the security data is transmitted to the at least one processor at predetermined intervals.

11. The non-transitory, computer-readable medium according to claim 9, wherein the operations further comprises:
    before receiving the security data, generating, by the secure element chip, a public-private key pair;
    uploading, by the secure element chip, a public key to the server for the server to send the public key to a certificate authority for authentication of the public key; and
    receiving, by the secure element chip from the server, the digital certificate indicating that the public key is authenticated.

12. The non-transitory, computer-readable medium according to claim 8, wherein the operations further comprise displaying, by the computing device, the two-dimensional code, and wherein the two-dimensional code comprises information associated with the account identifier, and changes dynamically over time.

13. The non-transitory, computer-readable medium according to claim 12, wherein the two-dimensional code changes dynamically according to changes of the code information generated by the at least one processor.

14. The non-transitory, computer-readable medium according to claim 8, wherein the two-dimensional code changes dynamically according to changes of the code information incurred by at least one of mixing one or more random numbers with the code information or mixing one or more timestamps with the code information.

15. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:
receiving, by a secure element chip of a computing device, security data sent by a server, wherein the security data is obtained by the server based on an account associated with the computing device;
storing, by the secure element chip, the security data;
receiving, by the secure element chip, a code refresh notification sent by the server in response to the server identifying a code scanning event trigger;
in response to receiving the code refresh notification, transmitting, by the secure element chip, the security data to at least one processor of the computing device for generating code information based on the security data;
receiving, by the secure element chip, the code information comprising an account identifier of the account associated with the computing device;
signing, by the security element chip, the code information by using a private key stored in the secure element chip to generate signed code information; and
providing, the signed code information to the computing device for the computing device to generate a two-dimensional code based on the code information.

16. The computer-implemented system according to claim 15, wherein the private key stored in the secure element chip is associated with a digital certificate received by the security element chip.

17. The computer-implemented system according to claim 16, further comprising:
before receiving the security data, generating, by the secure element chip, a public-private key pair;
uploading, by the secure element chip, a public key to the server for the server to send the public key to a certificate authority for authentication of the public key; and
receiving, by the secure element chip from the server, the digital certificate indicating that the public key is authenticated.

18. The computer-implemented system according to claim 15, wherein the operations further comprise displaying, by the computing device, the two-dimensional code, and wherein the two-dimensional code comprises information associated with the account identifier, and changes dynamically over time.

19. The computer-implemented system according to claim 18, wherein the two-dimensional code changes dynamically according to changes of the code information generated by the at least one processor.

20. The computer-implemented system according to claim 15, wherein the two-dimensional code changes dynamically according to changes of the code information incurred by at least one of mixing one or more random numbers with the code information or mixing one or more timestamps with the code information.

* * * * *